US008941474B2

(12) United States Patent
Mitchell

(10) Patent No.: US 8,941,474 B2
(45) Date of Patent: Jan. 27, 2015

(54) REAL TIME AUTOMATIC HEADCOUNT SYSTEM

(71) Applicant: Richard B. Mitchell, Wilton, CT (US)

(72) Inventor: Richard B. Mitchell, Wilton, CT (US)

( * ) Notice: Subject to any disclaimer, the term of this patent is extended or adjusted under 35 U.S.C. 154(b) by 0 days.

(21) Appl. No.: 13/974,966

(22) Filed: Aug. 23, 2013

(65) Prior Publication Data

US 2014/0091922 A1 Apr. 3, 2014

Related U.S. Application Data

(63) Continuation of application No. 11/360,005, filed on Feb. 22, 2006, now Pat. No. 8,558,689.

(51) Int. Cl.

*H04B 3/36* (2006.01)
*G08B 27/00* (2006.01)
*A62B 99/00* (2009.01)
*G06Q 50/26* (2012.01)
*G08B 25/01* (2006.01)

(52) U.S. Cl.

CPC ................ *G08B 27/00* (2013.01); *A62B 99/00* (2013.01); *G06Q 50/26* (2013.01); *G08B 25/016* (2013.01)
USPC ........................................ 340/407.1; 345/418

(58) Field of Classification Search

USPC ......................... 340/407.1; 345/418; 715/530
See application file for complete search history.

(56) References Cited

U.S. PATENT DOCUMENTS 7,180,415 B2 * 2/2007 Bankert et al. ........... 340/539.17

* cited by examiner

*Primary Examiner* — Shirley Lu
(74) *Attorney, Agent, or Firm* — Edwards Wildman Palmer LLP; Barry Kramer; Christopher J. Capelli

(57) ABSTRACT

A real time automatic headcount system is configured with a portable transmitter operated by a crisis coordinator and operable to output an alert signal which is received by a plurality of receivers which are coupled to respective persons associated with a crisis-event site. The receivers each generate an acknowledgement signal transmitted via a central processing unit to the transmitter. Upon receiving the acknowledgement signal, the central processing unit is operable to update a check list of all person associated with the crisis-event site, identify those who have not been accounted for and implement back up procedures for locating and accounting for the previously unaccounted for persons in real time.

15 Claims, 5 Drawing Sheets

REAL TIME AUTOMATIC HEADCOUNT SYSTEM

CROSS REFERENCE TO RELATED APPLICATION

This application is a Continuation of co-pending U.S. application Ser. No. 11/360,005 filed Feb. 22, 2006, which is incorporated herein by reference in its entirety.

FIELD OF THE INVENTION

The present invention relates to wireless communications systems and in particular, to an intelligent crisis headcount system which is operable to account for all persons associated with a site during a crisis event in real time.

BACKGROUND ART

A critical event—crisis—may dramatically impact an organization. Complying with federal regulations and guidelines, an organization typically has a business continuity plan (BCP)—a process of developing advance arrangements and procedures that enable an organization to respond to an event in such a manner that critical business functions continue with planned levels of interruption or essential change. Often, the BCP is primarily designed to recover, reestablish technical data damaged or lost during a critical event and typically provides a gradual execution of steps that may span over A prolonged period of time. A variety of technological systems are capable of ensuring the .continuity of service and support for business customers and to maintain its viability before, after and during an event.

Actions that have to be undertaken within first sixty (60) minutes after a crisis event has occured are usually described in an Emergency Action Plan (EAP). One of the most critical parts of EAP is monitoring evacuation and providing headcount of all employees, visitors and contractors associated with a crisis event site, such as a building.

Traditionally, methods for accounting people during a crisis event have been conducted by manual count, word and by other outdated techniques avoiding the use of technologically advanced communication systems. The manual crisis headcount process may have a few disadvantages. First, the manual process is open to human error. People tend to forget who they verbally communicate with rather rapidly; visual memory is also often unreliable. Secondly, without an automated integrated solution to the headcount problem, a crisis management team faces a lengthy and laborious course of action to gather information regarding those who are present at an alternate site and those who are not, but are supposed to be present. Thirdly, the manual process is particularly ineffective to account for those employees who were supposed to be at work but, for a variety of reasons, did not come in on the day of crisis.

Thus, the known methods of head counting during a crisis event are unreliable, ineffective and unable to meet the federal regulations requiring that that all people working at or visiting a site in crisis be accounted for in real time not exceeding sixty minutes after the crisis event.

Several attempts have been made to partially automate headcount processes during a crisis event but were not particularly successful. One of numerous reasons for such a relative failure is that electronically operated wiring systems are some of the first affected by critical events, such as fire, flood and other natural and/or man-caused disasters. The other reason is that these systems are relatively complex. A person, particularly a person under the stress, may be disoriented and not able to perform necessary actions requiring actuating an electronic device or system.

A need, therefore, exists for fully automated and integrated (intelligent) real time headcount systems that are capable of accounting for all persons associated with a site, such as employees, contractors and visitors, which is struck by a critical event in first sixty minutes.

Another need exists for intelligent real time headcount systems that are operable to account for all persons including those employees who have not reported to work on the day of a crisis event before, during and after the crisis event.

A further need exists for intelligent real time headcount systems that are operable to track unaccounted. for persons and train an alert signal to locations associated with the tracked persons in real time.

Still a further need exists for intelligent real time headcount systems that have a simple and reliable configuration and are capable of operating independently from an IT system of a crisis event site.

SUMMARY OF THE INVENTION

These needs are met by a system and method configured and operated in accordance with the present invention. The inventive intelligent headcount system provides for the execution of the recovery plan for implementing business continuity capabilities, procedures, and activities ensuring that all persons have been accounted for during a crisis-event site in real time in response to an emergency or disaster declaration.

In accordance with one aspect of the invention, the inventive intelligent real time headcount system and method are operable to locate, identify and realize a cyber headcount of all persons present at a crisis-event site during a crisis event in real time not exceeding sixty minutes. The intelligent real time headcount system includes an IT system which is completely divorced from IT systems operating at the site. The real time headcount system is automated and integrated to include a variety of communication devices wirelessly linked to one another via a communication link.

A hardware architecture is configured with a portable transceiver device operated by a crisis coordinator and capable of outputting an alert or emergency signal which informs multiple receivers about a crisis event and receives an acknowledgment signal from the receivers each associated with a person. The transceiver is coupled to a server configured to store a checklist containing information about all people who are present or should be present at a crisis-event site and to update it by flagging those people who respond to the alert signal or message. The transceiver is operable to periodically generate a succession of alert signals addressed to only those who have not yet responded to the previous alert signal.

In accordance with one aspect of the invention, a transceiver is a communication device including laptops, cell phones, PDAs and other communication wireless devices which are robust, effective and reliable. Preferably, but not exclusively, the transceiver has the Blackberry platform offering server software, laptop/web-based software and device software, which work together to manage the link between the transceiver, receivers, email, and vmail.

A crisis coordinator—a designated individual responsible for preparing and coordinating a cyber headcount—operates the transceiver by keying in the predetermined combination triggering an alert signal. Alternatively or in addition to an e-mail signal, the transceiver is operable to convey or generate a voice alert message. The alert message or signal is simultaneously blasted to numerous receivers.

In according to another aspect of the invention, each of numerous receivers is associated with a person and operable to respond to an alert signal. A receiver may be configured, among others, as a PC, laptop, cellular phone, IR and/or RF based device all capable of warning the person associated with the receiver. Depending on the technological capabilities of any given receiver, the person may access a crisis-event web page, which is operated by a server, via a PC, laptop, PDA and send back an acknowledgement signal identifying himself/herself. The acknowledgement signal received by the server is processed, the identity of the sender is recognized and the sender's status on the checklist is updated. The updated checklist is instantaneously accessed by a crisis coordinator. As mentioned above, the person with the updated checked-in status stops receiving the alert message/signal and is presumed accounted for.

At the same time, a transceiver operated by a crisis coordinator is operable to continuously display the names of persons who have responded to the alert message and those who have not so as to continuously update the coordinator. In addition, the transceiver may display the percentage of people who have not yet reported.

In accordance with a further aspect of the invention, the intelligent cyber head count system is also operable to employ a back-up headcount procedure if a person has not responded to a predetermined number of alert messages or during a predetermined period of time. The backup procedure may include sending a message to a next of kin contact stored in the memory of the server. In this case, the receiver outputs an alert message or signal directed to the next of kin person requiring that the next of kin person provide information regarding an unaccounted for person. Once the response is received and the location of the unaccounted for person is known to be anywhere outside the crisis-event site, he or she is checked off the checklist and, thus, rendered accounted for.

Alternatively or in addition to the next of kin procedure, the inventive cyber headcount system is operable to generate a back-up message sent to those who have been already accounted for. Still another alternative back-up procedure includes generating a message sent only to a selected group of colleagues or a single colleague who has been accounted for and typically works in close contact with an accounted person. The message requests that the recipients of this message provide information regarding the unaccounted for person. If a response contains information verifying that the unaccounted for person is at a location outside the crisis event, the search for him/her may end and his/her status is updated as checked-in and accounted for.

According to another aspect, a receiver associated with a person is operable to receive the alert signal even if the person is located at a great distance from the crisis-event site. Having been warned, the person can use any wireless or wired device coupled to a communication link to access a web page and send an acknowledgement message confirming his/her whereabouts. Alternatively or in addition to an email message, the person may call and leave a predetermined voice message which can be processed by the transceiver so that the person is rendered accounted for.

The inventive system allows the crisis coordinator to be pro-active. For example, if a person is injured and unable to answer the alert message, the coordinator may personally check out the identity of the injured person and update the checklist Similarly, when additional information conveyed either by word or electronically confirms that one or more unaccounted for persons have called in sick, taken a vacation or simply have not come in, the coordinator may personally update the status and render that person or persons accounted for.

In summary, the inventive cyber headcount system allows for accounting for a great number of people in real time using a simple, damage-resistant intelligent configuration.

BRIEF DESCRIPTION OF THE DRAWINGS

The above and other features and advantages of the present invention will become more readily apparent from the following specific description taken in conjunction with the accompanying drawings in which.

SPECIFIC DESCRIPTION

Figure 1:
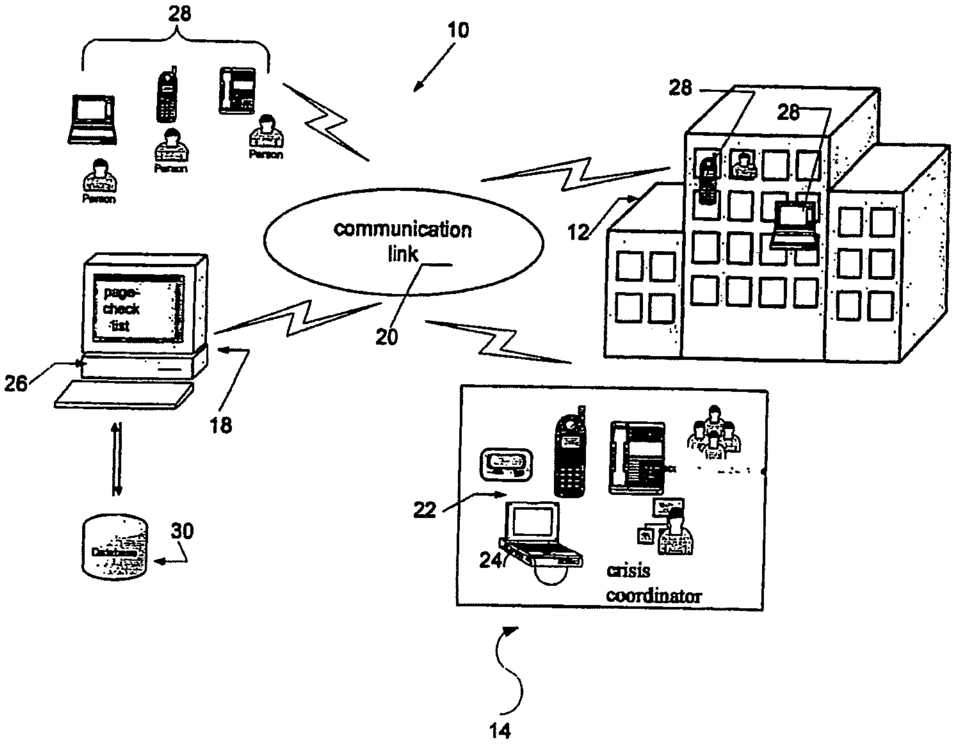
FIG. 1 illustrates the network architecture of the present invention in a preferred embodiment.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. The words "connect," "couple," and similar terms do not necessarily denote direct and immediate connections, but also include connections through intermediate elements or devices.

FIG. 1 illustrates a preferred embodiment of the inventive network architecture of a cyber real time headcount system 10. The system 10 is configured to operate in response to an alert signal output by a hand-held or stand-alone transmitter 22 which is under control of a crisis coordinator of a cite 12. The coordinator initiates cyber headcount system 10 by actuating transmitter 22 immediately upon learning about a crisis event and further monitors the evacuation procedure from, for example, an alternate site 14.

In response to an alert signal generated by transmitter 22 and transmitted through a communication link 20 by a transmitter's CPU 24, software executed by a CPU 26, which is associated with a server 18, blasts the alert signal including an email text message in accordance with the HTML protocol and/or a pre-recorded voice mail via communication link 20 to all contact points for every person associated with crisis-event site 12. Potentially, this could be thousands of emails and v-mails sent simultaneously.

Instantly, alert messages are transmitted to multiple receivers 28—computers and/or cell phones-each associated with a respective person at site 12 and outside thereof.

In response to receiving the alert message, a person operates receiver 28 so as to send an acknowledgement signal back to transmitter 22. The acknowledgement signal carries the identification of the person who, after the acknowledgement signal has been received and processed by server 18, has his/her status updated as accounted for and is presumed to be either outside site 12 or on his/her way out of this site. Updating of the status is associated with flagging the .name of the person on a checklist of all persons who are located at or supposed to be at site 12 during the crisis event. The accounted for person stops receiving subsequent alert signals.

Figure 2A:
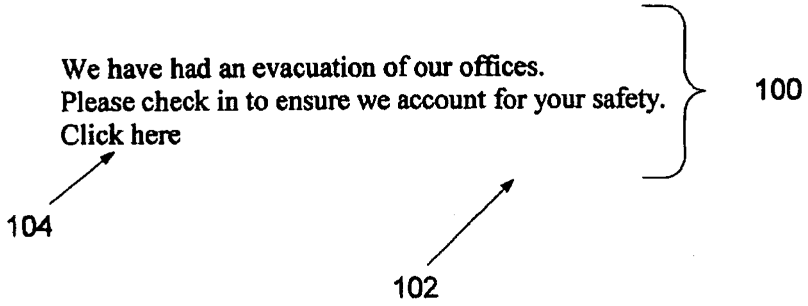
FIGS. 2A-2C illustrate examples of a Web page describing communication between a crisis-event coordinator and persons to be accounted for during a crisis event.

Referring to FIG. 2A in addition to FIG. 1, the display of a Web page 100 operated by server 18 describes an alert message 102 generated by CPU 26 of server 18 in response to the alert signal which is received from transmitter 22 via communication link 20 after the transmitter has been activated by the crisis coordinator. The Web page with alert message 102 is sent from server 18 to all contact points or receivers 28 at site 12 and to those contact points that are associated with persons who were supposed to be at site 12, but for various reasons have been absent at the time of the crisis, as will be explained below. The names of all persons, who are required to check-in, and respective identifiers, each of which associates a person with a receiver, are arranged in one or more checklists stored in a database 30 (FIG. 1) of the server 18. As can be seen in FIG. 2A, alert message 102 may, for example, say: "We have had an evacuation of our offices. Please check in to ensure we account for your safety."

If alert message 102 is to be transmitted via a computer network, each name on the checklist is uniquely associated with an e-mail address. As a consequence, a person receives alert message 102 appearing on the screen of his/her receiver/computer 28 and can immediately generate an acknowledgement signal in accordance with different techniques, as discussed below.

Figure 2B:
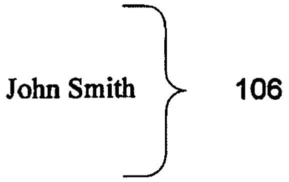

One of the techniques for responding to alert message 102 includes clicking on a URL 104 of Web page 100 provided in the text of alert message 102. This one-click operation, as illustrated in FIG. 2B, is associated with automatically generating an acknowledgement message .106, which reads, for example, "John Smith" and is automatically sent back to server 18. At server 18, acknowledgement signal 106 is processed so that the name of the sender is recognized based on the unique identifier of his/her computer, and his/her status is updated on the checklist as "OK" or "CHECKED-IN". Note that although server 18 associated with CPU 26 is illustrated separately from CPU 24 of transceiver 22, it may be integrally incorporated in transceiver 22 provided that the latter has necessary technological capabilities.

Figure 2C:
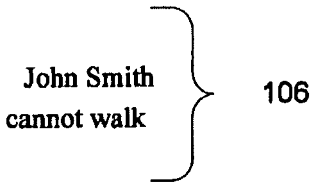

A further technique allows a person to add additional information to acknowledgement message 106. As illustrated in FIG. 2C, the person may answer alert message 102 by keying in his/her name and any further information helping update the person's status. For example, if the person is hurt, acknowledgement message 106 may read, for example, "Cannot walk." Since the acknowledgement message is processed by CPU 26 of server 18 (FIG. 1), a software executed by CPU 26 may quire a database 30 coupled to server 18 and identify the location of receiver 28 at site 12. As a result, a rescue team can be dispatch to the identified location to evacuate the handicapped person from site 12. The status of the identified person on the checklist is updated as 'OK' similarly to the first technique, and the person is considered as accounted for.

Each updated checklist is instantaneously accessed by receiver 22. Accordingly, the crisis-event coordinator always has information about those who have not yet reported and those who have in real time during a crisis event.

As the number of checked-in persons increases, each subsequent alert message periodically generated by transmitter by CPU 26 of server 18 is outputted to only those who have not yet responded.

The transmitter 22 is operable to transmit an electrical, electronic, electromagnetic or other suitable signal over wireless communication link or medium 20 upon activation by the coordinator. The transmitter 22 is coupled to CPU 26 to provide the coordinator with a continuous update regarding those who have checked in and those who have not. Assuming that everybody, present at the crisis-event site 12, has received the alert signal and responded to it, the entire cyber headcount may be accomplished in real time.

The transmitter 22 (FIG. 1) operated by the coordinator is preferably configured with a user interface device, a transmitting device and a receiver for receiving signals, all of which are not shown by well known in the wireless communication art. Accordingly, the transmitter/receiver combination may be configured and operated as a transceiver. Without any limitations, transmitter 22 may include a laptop, PDA or any other programmable communication device. Advantageously, transmitter 22 has a display allowing the coordinator to see a checklist of those who have reported in response to alert message 102 and/or those who have not yet checked in.

The inventive cyber headcount system can also operate in a mobile environment configured with cell phone communication devices that may function both as transmitter 22 and receiver 28. Each cell phone may be coupled to a respective computer or provided with in-built Internet capabilities.

In the mobile environment, a coordinator activates transmitter/cell phone 22 and sends an alert signal to server 18 (FIG. 1) which, in turn, transmits the alert voice message to multiple receivers 28 in accordance with a checklist of all persons who are or should be present at site 12.

In response to alert signal 102 (FIG. 2A), a person activates his/her cell phone/receiver 28. For example, the contacted person may call #800 number and enter his/her phone number. The incoming call is processed by an automatic answering service coupled to server 18 that is operative to identify, for example, the person's phone number by comparing the latter with the numbers stored in database 30. Each number is uniquely associated with a person's name which, when identified, is checked off the checklist as "OK" or "checked-in" as accounted for, and this information becomes immediately available to the coordinator.

Alternatively, activation of receiver/cell phone 28 may automatically generate an acknowledgement signal carrying for example a unique identifier of the receiver and the person associated with this receiver. The server 18 identifies a person and updates his/her status as accounted for on the checklist Only those persons who have not yet responded to the voice alert message receive subsequent alert signals. If cell phone/receiver 28 is based on the Blackberry platform, a person will be able to send an acknowledgement message having a standard or individually composed text via a computer network, as explained above in reference to FIGS. 2A-2C.

Figure 3:
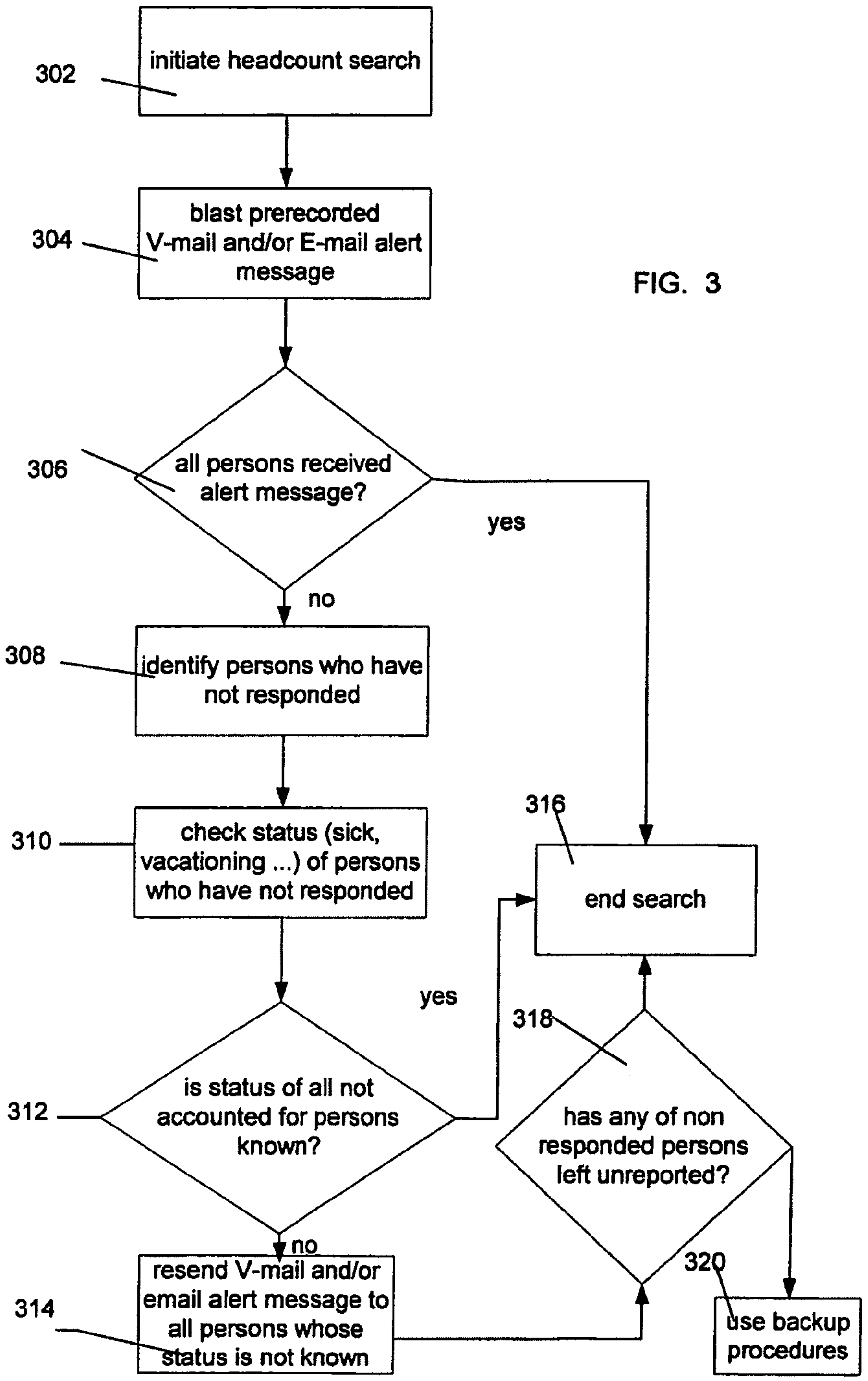
FIG. 3 illustrates the flow chart Of the inventive system and process.

Referring to FIG. 3, the inventive cyber headcount process is initiated by a coordinator as he leaves a crisis-event site for which he/she has just authorized the evacuation, as indicated by a step 302. To outcome an alert signal associated with a crisis event, the coordinator keys in a predetermined combination of keys on transmitter 22 coupled to server 18 which blasts prerecorded voice- and/or e-mail message 102 (FIG. 2A) to multiple persons located at crisis site 12 and outside this site via communication link 20, as shown by a step 304. Email addresses, telephone extensions and other destination contacts are stored in the memory of CPU 26 (FIG. 1) which also stores a checklist of all persons who are present at site 12 and those who are supposed to be present on the day of crisis.

The CPU 26 continuously monitors acknowledgement signals 106 (FIGS. 2B and 2C) generated by receivers 28 each associated with a person. If all persons have responded, as indicated by a step 306, the inventive cyber headcount process ends, as shown by a step 316. If CPU 26 determines that one or more persons from the checklist have not responded to the previous alert signal, the subsequent alert signal is repeatedly and automatically generated and sent to only those who have not been accounted for. Meanwhile, those persons who have not responded are identified and provided to the coordinator in a manner convenient for the coordinator, as illustrated by a step 308. Preferably, the updated checklist is displayed on transmitter 24.

As mentioned before the checklist includes employees, contractors and visitors. The names of the employees are stored in database 30 and may also be stored in the memory of CPU 26 of server 18.

The checklist is dynamically updated as the contingent of the employees changes. Routinely, each of the employees reporting to work may be checked in at the entrance of site 12 or he/she checks in upon arriving at his/her designated location within this site, and the pertinent information is received and processed by server 18 so as to update the checklist on every given day. Similarly, when an employee leaves cite 12 for the day or for some time, this information is processed again by updating the status of this employee on the checklist Similarly, all visitors, contractors and anybody else who may visit site 12 are checked in and may be provided with receiver 28. Each visitor may, for example, be given a cell phone having a unique identifier which is temporarily stored at server 18.

It is important that the inventive cyber headcount system also be operable to account for those persons who were supposed to be at work during a crisis event, but, for a variety of reasons have not been at site 12. Some of employees may, for example, call in sick, be on vacation, business trips or simply leave site 12 before a crisis event has occurred. To account for these persons during the crisis event, CPU 26 (FIG. 1) is operable to obtain additional information of at least some of these employees, as shown by a step 310. This is realized by software executed by CPU 26 which queries database 30 regarding a current status of any unaccounted for person on the day of the crisis event. For example, one of the employees called in sick and, thus, did not report to work. This information is processed by CPU 26 before the crisis event has happened. To provide CPU 26 with this information, either the caller, or a person who spoke to or received a message from the caller communicates with the coordinator who updates the person's status. Alternatively, an automatic procedure allows the caller or any other person to input an email and/or vmail message that is processed by CPU 26 updating the current status of the caller on the checklist Speech-to-text, text-to-speech software executed by CPU 26 may render the presence of a real person on the receiver end obsolete, since the current checklist can be updated automatically.

During the crisis event, when acknowledgement message 106 (FIGS. 2B, 2C) is not received from a person, CPU 26 may quire database 30 and receive additional information indicating that this person was sick and, thus, was not present at site 12 during the crisis event. As a consequence, the sick person is accounted for. Still another scenario is when a person is on .a business trip or is taking a vacation. The information related to the status of such a person and the length of his/her trip or vacation are stored in the memory of CPU 26. Moreover, this information may contain additional information, such as telephone numbers of hotels in which the person intends to stay and his/her itinerary. Once a vacationer, traveler or any other person who does not report to work receives the alert message saying, for example, "we have had an evacuation of our NYC offices. Please check in to ensure we account for your safety", he will send the acknowledgement signal via a telephone, cell phone or computer. Upon processing acknowledgement message 106 by CPU 26, the status of the person is updated on the checklist as accounted for, as illustrated by a step 312.

If the acknowledgment message is not received after a predetermined number of alert messages or during a predetermined period of time, subsequent alert messages 106 are resent, as illustrated by a step 314 to only unaccounted for persons. If the status of the unaccounted for persons has not been updated after the predetermined period of time or number of alert messages, as indicated by a step 318, CPU 26 may employ a backup procedure, as shown by a step 320.

Figure 4A:
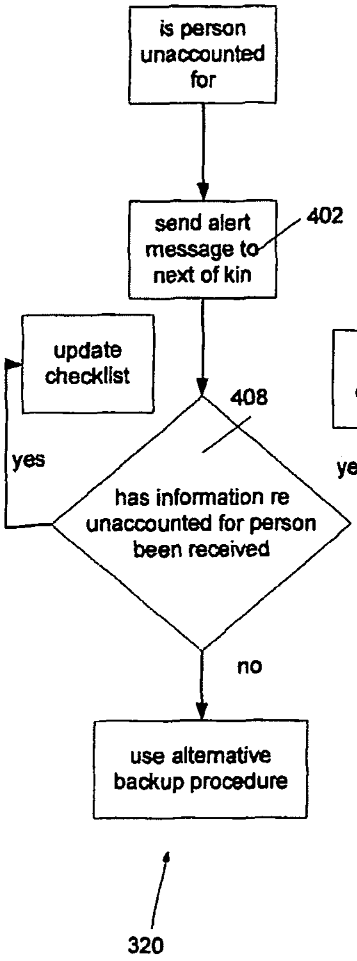
FIGS. 4A-4C illustrate various back-up procedures for locating unaccounted for persons.

Referring to FIG. 4A, the backup procedure 320 may be implemented by CPU 26 in several ways. One implementation is illustrated by a step 402 and includes identifying next of kin or an emergency contact provided by the identified unaccounted for person and stored in the memory of CPU 26. If no information that may help account for a person is received from the next of kin contact, as shown by a step 408, the inventive system may employ an alternative procedure better illustrated by FIG. 4B.

Figure 4B:
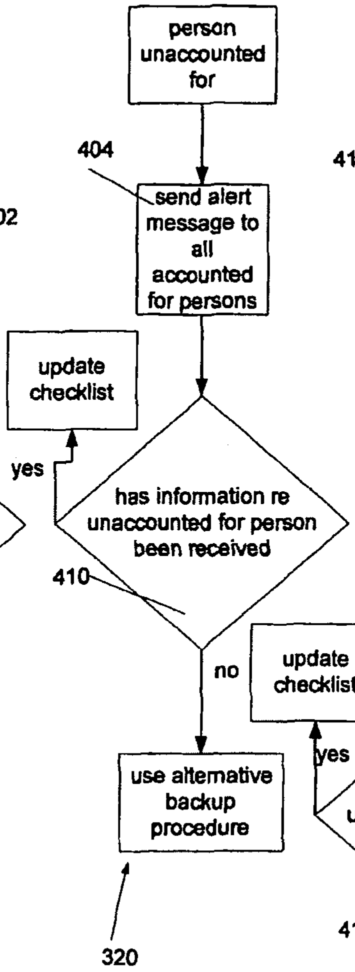

FIG. 4B illustrates one of the alternative backup procedures including blasting a message to all of the accounted for persons which requests that any available information regarding the unaccounted for person be immediately sent to the crisis event coordinator, as shown by a step 404. If no meaningful information has been received, as illustrated by a step 410, the inventive system utilizes still another alternative procedure shown in FIG. 4C.

Figure 4C:
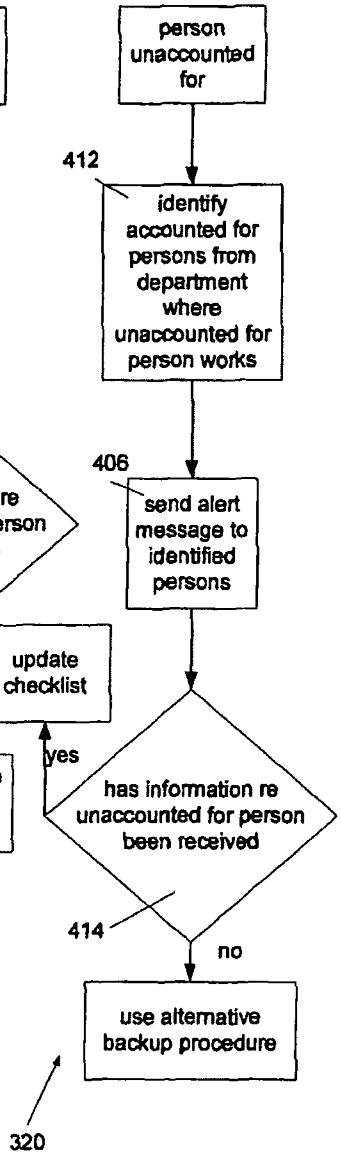

As indicated by a step 412 of FIG. 4C, initially a department in which an unaccounted for person typically works and persons working in this department are identified by querying database 30 (FIG. 1). Subsequently, those of the identified persons who have been already accounted are determined, and message to the identified and accounted for persons from this department is sent, as illustrated by a step 406. The message basically requests that its recipients provide any possible information they may have regarding the unaccounted for person. If the unaccounted for person is still not contacted, as shown by a step 414, any of the backup procedures may be repeated.

If none of the backup procedures successful, the process ends by displaying the names of the unaccounted for persons and, if required, a checklist of all persons who have been accounted for. All in all, the entire cyber headcount process may last a few minutes and gather information about hundreds and hundreds of people in practically real time.

Figure 5:
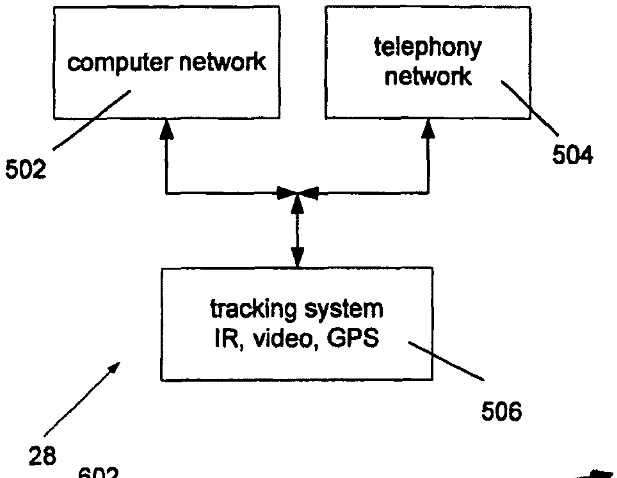
FIG. 5 illustrates a receiver network employed in the inventive system.

Returning to receivers 28, a few configurations thereof may be easily implemented. As shown in FIG. 5, receivers 28 may include a computer network 502, telephony system 504, and a tracking system 506 which may be integrated in the inventive cyber headcount system, as explained below.

The computer network system 502 may include a plurality of computers assembled in a LAN which is a computer network limited to a relatively small area such as an office building, university, or even a residential home. Most mid to large-sized businesses today use LANs, which makes it easy for employees to share information. Currently, with the emergence of wireless networking, wireless LANs have become increasingly accessible. The software architecture may be a Linux-based operating system which is easily customizable.

The current hardware platforms for Linux software are Intel, PowerPC, DEC Alpha, Sun Sparc, and Motorola. Alternatively, a Windows-based server may be used as well.

Alternatively, the computers may be part of a WAN, Wide Area Network. It is similar to a Local Area Network (LAN), but it's a lot bigger. Many wide area networks span long distances via satellite links. Of course, one of the examples of the WAN is the Internet. Included in the computer category are various PDAs. Today's PDAs are operable to surf the Internet, receive and send e-mails.

The telephony system 504 may be operated in accordance, with WAP—wireless application protocol. This protocol operates similarly to the hypertext transfer protocol and standardizes the manner in which a cellphone is able to access the Internet, such as e-mail and the Web. One of the methods of using the telephony system as a receiver is to access CPU 26 by calling the 800 # and enter a home phone if a calling person stays home. This communication is automatically included in the cyber headcount. The inventive cyber headcount system is also configured to track persons at site 12 and outside thereof. Typically, people move around site 12. As a consequence, some persons may not be in the vicinity of their respective computers at the time of the crisis event. A further problem may be associated with certain areas of site 12 in which the reception of RF signals is problematic. To track and inform persons who cannot be contacted at site 12 or outside this site, the inventive headcount system is additionally configured with IR-based, video-based and GPS-based tracking systems.

Figure 6:
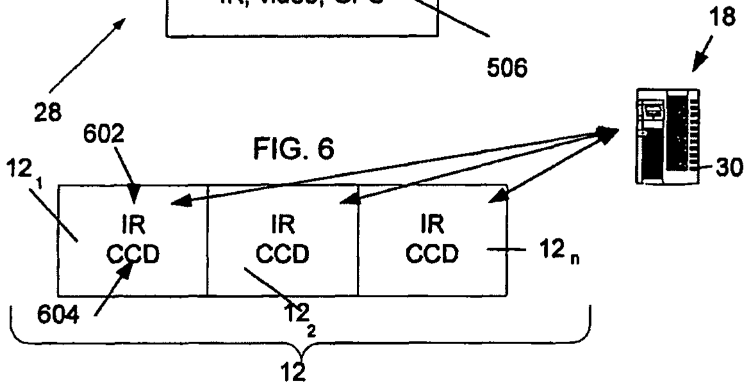
FIG. 6 schematically illustrates an embodiment of the inventive headcount system including a tracking system based on IR and video technologies.

The tracking system • 506 comprises, for example an IR-based system 602, as shown in FIG. 6, includes a plurality of IR badges carried by respective persons and each communicating with a plurality of scanners (not shown) which are placed all over site 12 divided in numerous regions 121, 122 . . . 12n. The IR-based tracking system allows each IR-device to generate an event-triggered signal carrying a specific identifier typically associated with a location. If a person is at a location remote from his/her computer, the signal of the IR badge is transmitted to server 18 which identifies the person's location and forward email alert message 102 (FIG. 2A) to a computer located in the vicinity of the current location of the person. Alternatively or in addition to the email message, CPU 26 of server 18 can reroute a phone call containing the audible alert message to a telephone that is installed in the vicinity of the current location. The person may use any computer or telephone to output acknowledgement message 106 (FIG. 2B) which is subsequently processed to update the status of the person On the checklist A further embodiment of a tracking system may be a video-based tracking system 604 (FIG. 6). Similarly to the IR-based system, site 12 may have a plurality of video cameras, such as CCDs, that are able to capture images of persons and transmit the captured images to server 30. A software executed by CPU 26 of the server is capable of recognizing the captured images by comparing them with images stored in database 30. Since the captured image also carries information regarding the location where the image was captured, the person may be contacted at that location by rerouting the alert signal to a phone or computer at the identified location. Once contacted, the person will call in or email thereby generating an acknowledgement signal, as discussed above.

Figure 7:
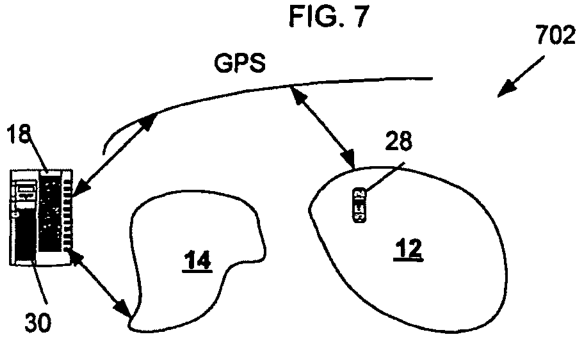
FIG. 7 schematically illustrates a further embodiment of the inventive headcount system including a tracking system based on GPS technologies.

Still another embodiment is illustrated in FIG. 7 and includes a GPS-based system 702. The system 702 may include a small hand-held transceiver, such as a bracelet carried by each person and operable as receiver 28 to receive broadcast signals from a ground based position system associated with transmitter 22. Alternatively, a cell phone configured with a GPS feature may be used as receiver 28. The ground based position system generally rides on a sub carrier in the cellular bandwidth. In the present invention, the ground based systems may either be used as a primary locator system with multiple satellites as a backup, or as a backup system when the satellites are used as a primary locator system.

Each receiver then encodes these coordinates into a data package and sends the data to a transmitter. The transmitter may be any type of cellular transmission system, such as that used for digital cellular telephone services known as the personal communications services, or a two-way paging also known as an interactive paging. In such a system, server 18 is provided with a central receiver-transmitter that covers a cell represented by crisis-event site 12. The receiver 28 transmits a signal when triggered by an emergency button which is pressed by the person or remotely actuated by CPU 26. Upon receiving and processing this signal, the person's current location at site 12 is identified, and the alert signal is forwarded to the current location. All in all, system 10 is capable of accounting for employees, visitors and contractors associated with cite 12 within first 60 minutes after the crisis event has occurred.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

The invention claimed is:

1. A real time automatic headcount system comprising:

a checklist stored in an electronic database, the checklist including a name and a unique identifier of persons expected to be at a given; and a computer controlled alert notification system having a central processing unit operable to generate a first alert signal upon the occurrence of a crisis event affecting a site such that an alert signal is transmitted to persons on the checklist wherein each said alerted person has a receiving device capable of receiving the first alert signal and transmitting an acknowledgement signal indicating that the person has been informed about the crisis event whereby upon receiving an acknowledgment signal the notification system is further operable to update the checklist for each person that sent an acknowledgment signal as being accounted for and to transmit a second alert signal to each person that has been accounted for on the checklist whereby the second alert signal solicits information about at least one person on the checklist who has not been accounted for.

2. The real time automatic headcount system as recited in claim 1 wherein the alert notification system comprises a portable transmitter operable to generate the first and second alert signals.

3. The real time automatic headcount system as recited in claim 2 wherein the alert notification system further comprises an output device displaying the checklist and allowing a coordinator to see, in real-time, which persons on the checklist have been accounted for.

4. The real time automatic headcount system as recited in claim 1, wherein the alert notification system is operable to generate a succession of said second alert signals selectively transmitted to the receivers associated with persons on the checklist whose status has not been updated in response to a said first alert signal.

5. The real time automatic headcount system as recited in claim 2, wherein the portable transmitter, receiving devices and central processing unit are wirelessly coupled to one another.

6. The real time automatic headcount system as recited in claim 5, wherein the portable transmitter and each of the receiving devices associated with a person on the checklist are configured as a wireless communication device selected from the group consisting of a PC, laptop, PDA and cell phone and a combination of these.

7. The real time automatic headcount system as recited in claim 1, wherein the first alert signal comprises a message informing persons on the checklist about the crisis event and requesting an acknowledgement signal, the message comprising at least one of an e-mail message, a voice message and a combination of these.

8. The real time automatic headcount system as recited in claim 1 wherein persons on the checklist include employees, visitors, and contractors, expected to be present at a site at any given moment.

9. The real time automatic headcount system as recited in claim 8 wherein persons on the checklist include all persons expected to be present at a site at any given moment.

10. A non-transitory computer readable storage medium containing one or more programs which when executed implement operations, the operations comprising:

maintaining a checklist of persons, including employees, visitors, and contractors, expected to be present at a site at any given moment;

transmitting a first alert signal indicative of a crisis event to a plurality of receivers each associated with a single person on the checklist;

receiving an acknowledgement signal from at least one receiver in response to the first alert signal, the acknowledgement signal indicating that the person associated with the one receiver has been informed about the crisis event;

updating a status of the person as accounted for on the checklist; and transmitting a second alert signal to each person that has been accounted for on the checklist, wherein the second message solicits information about at least one individual who has not been accounted for on the checklist 11. The non-transitory computer readable storage medium as recited in claim 10 wherein the operations further comprise receiving a message from at least one person who has been accounted for on the checklist regarding the at least one individual.

12. The non-transitory computer readable storage medium as recited in claim 10 wherein the checklist includes all persons expected to be present at a site at any given moment and updating the status of the individual on the checklist.

13. A processor-implemented method for conducting an automatic headcount during a crisis event, comprising:

maintaining, by a processor, a checklist of persons, including employees, visitors, and contractors, expected to be present at a site at any given moment;

transmitting, by a processor, a first alert signal indicative of a crisis event to a plurality of receivers each associated with a single person on the checklist;

receiving, by a processor, an acknowledgement signal from at least one receiver in response to the first alert signal, the acknowledgement signal indicating that the person associated with the one receiver has been informed about the crisis event;

updating, by a processor, a status of the person as accounted for on the checklist; and transmitting, by a processor, a second alert signal to each person that has been accounted for on the checklist, wherein the second message solicits information about at least one individual who has not been accounted for on the checklist.

14. The processor-implemented method for conducting an automatic headcount during a crisis event as recited in claim 13 wherein the operations further comprise receiving a message from at least one person who has been accounted for on the checklist regarding the at least one individual and updating the status of the individual on the checklist 15. The processor-implemented method for conducting an automatic headcount during a crisis event as recited in claim 13 wherein the checklist includes all persons expected to be present at a site at any given moment.

* * * * *